Nov. 28, 1939.     L. WINTERS     2,181,844
COLLAPSIBLE HOUSE TRAILER
Filed July 16, 1938     2 Sheets-Sheet 1

INVENTOR—
Leo Winters

Nov. 28, 1939.  L. WINTERS  2,181,844
COLLAPSIBLE HOUSE TRAILER
Filed July 16, 1938   2 Sheets-Sheet 2

INVENTOR—
Leo Winters

Patented Nov. 28, 1939

2,181,844

UNITED STATES PATENT OFFICE 2,181,844

COLLAPSIBLE HOUSE TRAILER

Leo Winters, Detroit, Mich.

Application July 16, 1938, Serial No. 219,539

2 Claims. (Cl. 296—23)

My invention relates to collapsible house trailers, and its principal object is to provide a trailer of the character referred to which is adapted for residence over long periods of time as distinguished from the usual temporary or holiday periods for which the present type of house trailer is employed.

In house trailers as at present constructed, requirements of the present State laws are that the structure as a whole shall be kept within over-all dimensions as specified by the said laws, the consequence of which is that furniture and other equipment necessary for daily life within the trailer must be of a very small size, primitive in construction, and not at all adapted to provide the comforts which are necessary to residences for over long periods.

The principal object of the present invention is to provide a trailer which when in collapsed or closed condition will meet all the requirements of the various State laws as regards over-all dimensions but which when opened up for residence purposes provides ample room for ordinary house or apartment furniture as distinguished from the temporary, make-shift, and built-in equipment which is at present employed. In other words, my improved trailer when in the opened condition is suitable for all the year round residence of persons who wish to live in one place for a considerable period and at the same time desire to change their location after relatively long intervals.

Another object of my said invention is to provide a collapsible house trailer which is simple in construction and cheap to manufacture by modern production methods, and which at the same time presents a home-like and artistic appearance when in the opened up condition.

A further object of my invention is to provide means whereby the movable or folding elements of the trailer may be partially balanced, so that the effort required to open or fold up the trailer is reduced to a minimum.

With these and other objects in view, I will now describe a preferred embodiment of my invention with reference to the accompanying drawings, in which—

Like characters designate corresponding parts throughout the several views.

Figures 4, 5:
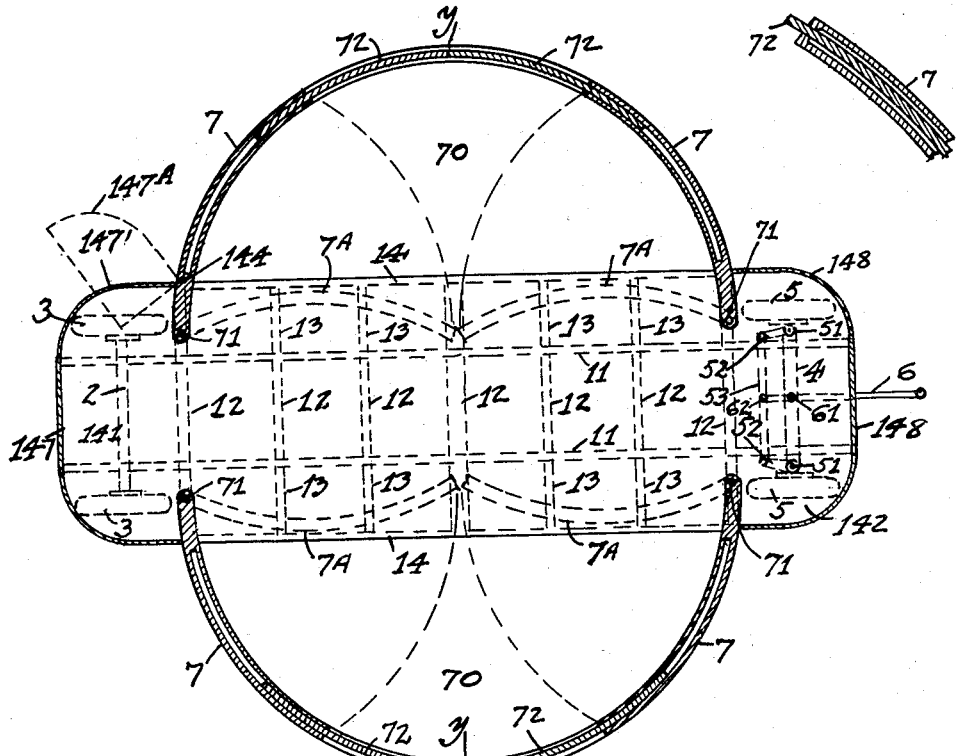
Figure 4 is a plan view of the same, partly in section.
Figure 5 is a fragmentary horizontal section showing the construction of the swinging elements which form the sides of my improved trailer.

In the drawings, 1 designates a chassis frame which consists essentially of a pair of longitudinal members 11 connected by transverse members 12 and having lateral members 13 which extend outwardly to the sides of the vehicle and are connected by longitudinal members 14, as shown more clearly in Figure 4 of the drawings. The longitudinal members 11 extend rearwardly beyond the transverse members 12 and are connected by suitable suspension springs to a rear axle 2 which carries suitable road wheels 3 of any ordinary construction, while the said members 11 extend forwardly beyond the transverse members 12 where they are connected by suitable suspension springs to a front axle 4, the said axle carrying road wheels 5 which are carried upon steering knuckles 51 and provided with steering arms 52, the latter being connected through the usual transverse steering rod 53 which is adapted to be moved back and forth by means of the trailer hitch lever 6 pivoted to the axle at 61 and connected to the rod 53 at 62. The spring suspension means as well as the wheels, axles, and steering mechanism may be of any ordinary conventional construction and form no part of the present invention, so that it is not deemed necessary here to describe them further.

Pivoted to the end transverse members 12 as at 71 are the arcuate walls 7 shown at 7A in broken lines in the closed position in Figure 4 and in solid lines in the same figure in the extended or opened up position in which, as will be observed by reference to the drawings, they provide spaces 70 which form extensions of the central chamber or space above the chassis frame. Slidably mounted within the arcuate walls 7 are the doors 72 shown in full lines in their extended positions in Figure 4 and provided with windows of glass or other transparent material as indicated at 75 in the right hand portion of Figure 1. The said doors are carried upon upper and lower wheels or rollers 73 which engage track members 74 within the wall 7. In this manner, as shown in the plan view Figure 4, a very roomy and convenient interior space is provided within the trailer, the main portion including the spaces 70 and a central space over the chassis frame forming a room of considerable size which is adapted to receive any ordinary type of parlor furniture and presents a very attractive appearance both from the inside and the outside.

The spaces between the extreme transverse members 12 and the end walls 147, 148 of the trailer serve to provide on the one hand, as indicated at 141 in Figure 4, a space suitable for a closet, lavatory, or other purposes, while the space at the other end designated 142 forms a very convenient space for a kitchen, including a stove, refrigerator, and other conveniences.

Figure 1:
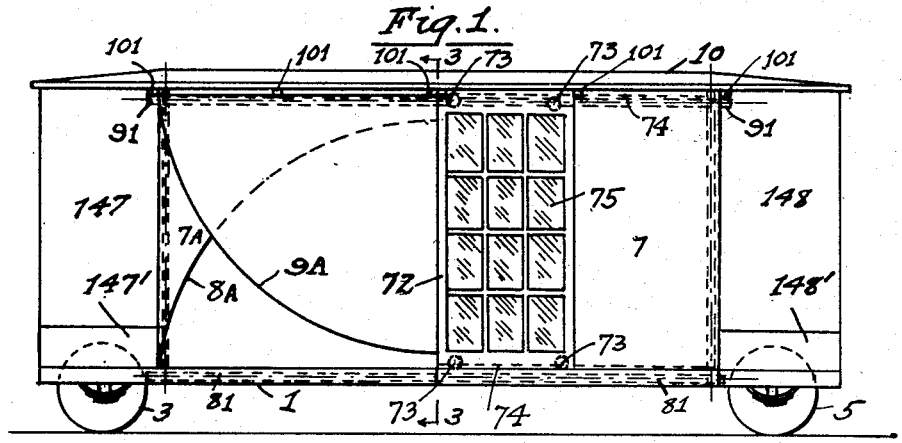
Figure 1 is a side elevation of my improved house trailer in which the left hand portion shows the same in the closed or folded up condition, while the right hand portion shows it in an opened up condition ready for occupation as a residence.
Figure 3:
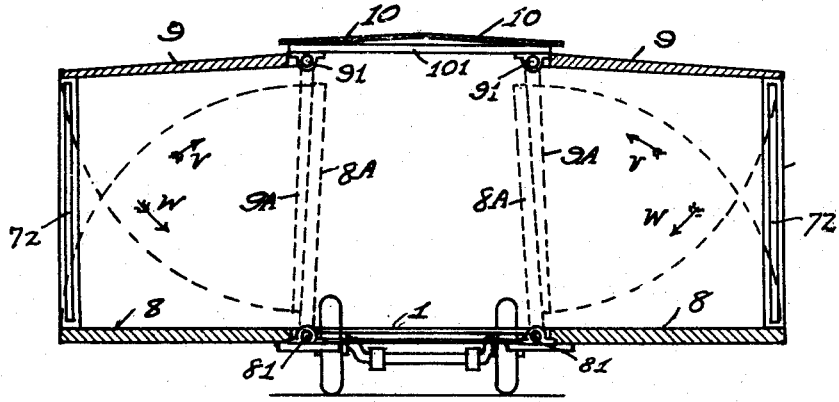
Figure 3 is a transverse section of the trailer showing the positions occupied by the various parts when opened up for residential purposes, taken on line 3—3 of Figure 1.

In order to provide a floor for the spaces 70 there are the members 8 of substantially semicircular shape shown at 8A in the left hand portion of Figure 1 in the folded position and in Figure 3 in the extended position, the said members being hinged at 81 to the main chassis frame and being adapted to swing around their hinges into their closed position as indicated at 8A in the transverse section, Figure 3.

Similarly, in order to provide roof structures for the spaces 70 there are the substantially semicircular members 9, pivoted at 91 shown at 9A in closed position in the left hand portion of Figure 1 and in opened position in Figure 3, the said members being positioned in a sloping direction in order to provide suitable drainage, and in overlapping relation with the members 9 are the inclined roof members 10, as indicated in the transverse section Figure 3.

Figure 2:
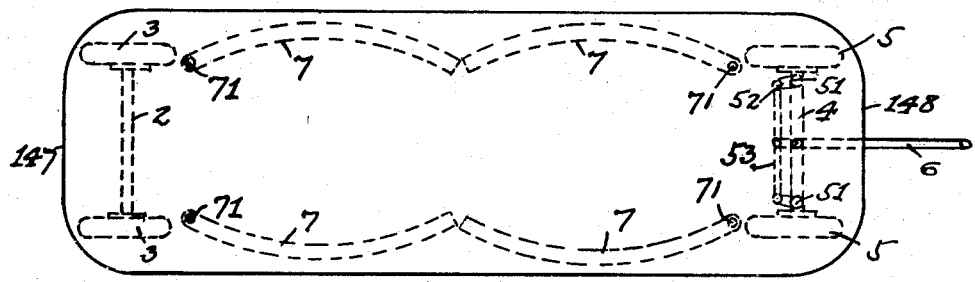
Figure 2 is a plan view of the same showing the parts in their folded or closed positions, in broken lines.
Figure 6:
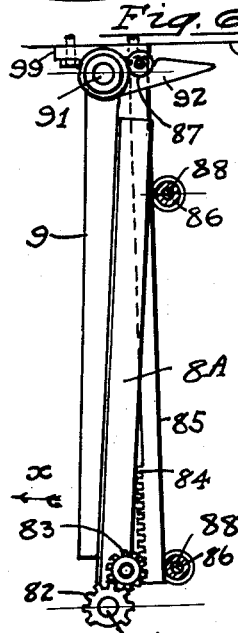
Figure 6 is a vertical transverse section drawn to an enlarged scale showing one form of the mechanism by which the movable parts of my improved trailer may to some extent balance one another so that their manipulation is very much facilitated and simplified.

It will thus be seen that when the various elements are in their closed position, as indicated in the left hand half of Figure 1 and in plan view Figure 2, the roof members 9 are first raised in the direction of the arrow x in Figure 6 until they occupy the positions indicated in Figure 3. The floor members 8 are then swung downwards from their positions as shown at 8A in Figure 3 to the horizontal positions designated 8 in the same figure. The wall members 7 are then swung outwards until they occupy the positions indicated in Figure 4, and the doors 72 are slid outwards in a radial direction upon their supporting wheels 73 until they meet at y in Figure 4. The trailer is then opened for use and the furniture and other equipment, which in the meantime has been stored in a compact manner within the closed trailer, are moved outwards into positions convenient for use, as will be understood.

In order to allow free access to the wheels 3 and 5, the lower portions of the end walls designated 147', 148' are hinged as at 144 so that they may swing around as indicated at 147A in Figure 4.

Figure 7:
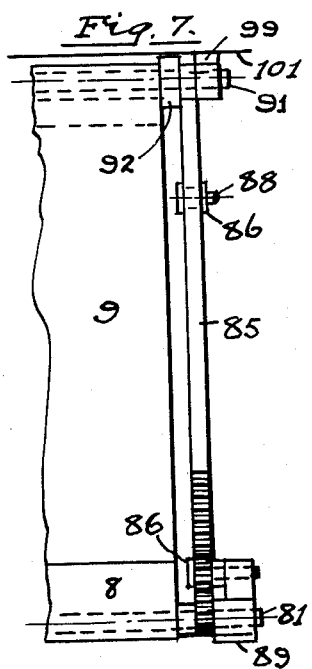
Figure 7 is a fragmentary side elevation of the same.
Figure 8:
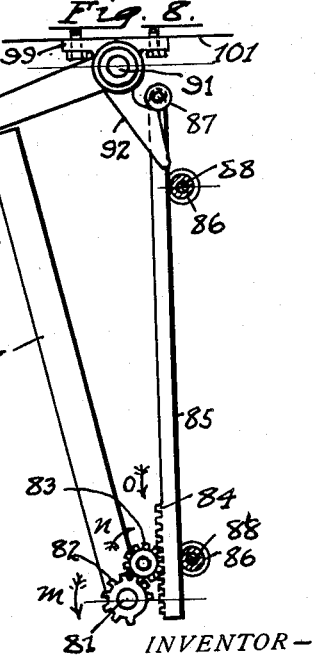
Figure 8 is a fragmentary transverse section corresponding to Figure 6 but showing the main elements of the structure in partly opened positions.

In the enlarged fragmentary views Figures 6, 7 and 8, a portion of one of the roof members 9 is shown pivoted upon the shaft 91 and a portion of one of the floor members 8 is also shown pivoted upon the shaft 81. The shaft 91 is carried in bearings 99 which are secured to transverse members designated 101 in Figure 3, while the shaft 81 is carried in bearings 89 secured by any suitable means to the chassis frame. Keyed to the shaft 91 are the cam-like members 92 upon which depend, when the parts are in the closed position as shown in Figure 6, rods 85 provided with grooved guide rollers 86 rotatably carried on suitable pins 88 attached to the framework. The upper ends of the rods 85 carry rollers 87 which bear upon the cam members 92, and their lower ends are provided with racks 84 adapted to engage with pinions 83 also carried upon suitable shafts. The pinions 83 mesh with segmental gears 82 upon the shafts 81 by which a partial balancing of the members is obtained, as before stated.

In operation, the parts being in their closed positions as indicated in Figure 6, the roof members 9 are first swung outwardly in the direction indicated by the arrow x in that figure. The cam members 92 moving downwardly, leave the rods 85 with their rollers in their upper position, being so held due to the connection of the racks with the co-acting pinions. Continuation of the upward movement of the member 9 allows the downward movement of the floor member 8 to commence until they reach the position shown in Figure 8. This initial movement causes the rods 85 to move downwardly until the rollers 87 again rest upon the cam members 92, at which point, as will be obvious, the force exerted by the movement of the floor members produces downward pressure upon the cam members, and further movement of the floor members in the direction indicated by the arrow z in Figure 8 causes a corresponding movement of the cam members, so that the falling of the floor members helps to raise the roof members, as indicated by the arrow x, to an extent depending upon the configuration of the cam members. The arrows m, n, o indicate the respective directions of movement of the racks and associated pinions.

It will be understood that the balancing gear is applied at both ends of the members 8 and 9 and that suitable framing will, of course, be provided for supporting the pins 88 carrying the rollers 86 and the pinions 83, and stops will also be provided for limiting the movements of the members 8 and 9. It is, however, deemed unnecessary to further describe or illustrate these features.

It will be observed from the foregoing description and by reference to the drawings that I have provided a trailer which provides a very great advance in the art, and while I have herein described and shown a preferred embodiment of my invention, it will be readily understood that various modifications in detail may be made to suit particular or peculiar requirements without departing from the spirit of my invention as defined in the appended claims.

Having thus described my said invention, what I claim and desire to secure by Letters Patent of the United States is:

1. A trailer comprising a main chassis mounted upon road wheels and having fixed floor and roof members and also fixed wall sections defining permanently enclosed spaces at each end, the sides intermediate said spaces being normally open; auxiliary floor members of substantially semicircular shape hinged to said chassis and adapted for form extensions of the fixed floor member and to fold upwards against the sides and fill the open spaces therein; auxiliary roof members of substantially semi-circular shape hinged to said chassis and adapted to form extensions of the fixed roof member and to swing downwards upon the folded floor members; arcuate wall members pivoted to said fixed floor and roof members and adapted to coincide with the edges of said auxiliary floor and roof members and to partially enclose the spaces therebetween, and to swing inwardly into folded positions within the main chassis; and arcuate door sections arranged in telescopic relation with said wall members and adapted to extend outwardly to complete the enclosure of the semi-circular spaces between said auxiliary floor and roof members.

2. In a trailer having a main body provided with fixed floor and roof members and having auxiliary floor and roof extensions hinged to said main floor and roof members, respectively, and adapted to fold upon one another when not in use, means interposed between said floor and roof extensions whereby the downward pressure of the roof extension is caused to assist the upward movement of the floor extension and whereby said floor and roof extensions may be moved in proper timed relation, said means comprising a cam upon the roof extension, a rod slidable upon the body and having its upper end carried upon said cam member and its lower end provided with a toothed rack, a pinion fixed upon said floor extension, and gearing intermediate said rack and said pinion.

LEO WINTERS.